United States Patent [19]
Damschroder

[11] Patent Number: 5,234,627
[45] Date of Patent: Aug. 10, 1993

[54] STABILITY CONDUCTIVE EMULSIONS

[75] Inventor: Brian L. Damschroder, Centerville, Ohio

[73] Assignee: DAP, Inc., Tipp City, Ohio

[21] Appl. No.: 805,026

[22] Filed: Dec. 11, 1991

[51] Int. Cl.$^5$ .......................... H01B 1/00; H01B 1/04; H01B 1/14
[52] U.S. Cl. .................................... 252/502; 252/506; 252/510; 252/511; 427/117; 427/120; 106/14.13
[58] Field of Search .................. 252/502, 510, 511; 427/117, 122, 434.6, 120; 106/14.13

[56] References Cited

U.S. PATENT DOCUMENTS

| | | | |
|---|---|---|---|
| 3,864,305 | 2/1975 | Jordan et al. | 260/42.47 |
| 3,922,335 | 11/1975 | Jordan et al. | 423/450 |
| 3,952,087 | 4/1976 | Antonsen et al. | 423/450 |
| 4,005,170 | 1/1977 | Harris | 264/117 |
| 4,007,147 | 2/1977 | Leeson et al. | 260/29.4 |
| 4,035,336 | 7/1977 | Jordan et al. | 260/42.47 |
| 4,105,750 | 8/1978 | Horn et al. | 423/456 |
| 4,279,880 | 7/1981 | Giet | 252/502 |
| 4,357,442 | 11/1982 | Shah | 524/745 |
| 4,472,463 | 9/1984 | Solomon | 427/381 |
| 4,534,998 | 8/1985 | DuPont et al. | 427/122 |
| 4,547,311 | 10/1985 | Sako et al. | 252/511 |
| 4,589,999 | 5/1986 | Vasta | 252/511 |
| 4,619,960 | 10/1986 | Dodge | 524/245 |
| 4,705,646 | 11/1987 | DuPont et al. | 252/511 |
| 4,740,426 | 4/1988 | Tremper, III | 428/423.7 |
| 4,810,600 | 3/1989 | Penard et al. | 429/224 |
| 4,957,723 | 9/1990 | Nishino | 423/449 |
| 4,988,562 | 1/1991 | Ryoke et al. | 428/323 |

Primary Examiner—Paul Lieberman
Assistant Examiner—M. Kopec
Attorney, Agent, or Firm—Biebel & French

[57] ABSTRACT

Improved conductive latex dispersions are disclosed comprising a specific blend of conductive carbon black particles. The carbon black component of the blend comprises acetylene carbon black particles and furnace black particles, with the furnace black particles having a nitrogen surface area (m$^2$/gm) of about 250 or greater and a DBP absorption value cc/100 gm of about 180 or above. The dispersions exhibit stable viscosity upon usage and storage and still result in acceptable conductivity.

7 Claims, No Drawings

STABILITY CONDUCTIVE EMULSIONS

FIELD OF THE INVENTION

The invention relates to conductive latex emulsions that are useful in coating applications, such as, for example, in the coating of spark plug wires or electrical harness assemblies. A specific blend of carbon black particles in the emulsion enhances stability of the emulsion.

BACKGROUND OF THE INVENTION

Conductive latex emulsions having conductive carbon black or graphite particles dispersed in the carrier liquid are well known. A variety of carbon black forms including furnace blacks and acetylene blacks have been used in such emulsions to impart the requisite conductive properties to the emulsion and, ultimately, to the desired substrate coated therewith.

Oftentimes, the addition of carbon black pigments increases the viscosity of the emulsion and is therefore deleterious to handle ability and storage properties. For example, high viscosity is undesirable since it interferes not only with product storage, but decreases coating efficiency. On the other hand, if an insufficient amount of the carbon black particles is added to the latex emulsion, conductivity properties suffer.

Accordingly, it is an object of the invention to provide a conductive latex emulsion containing conductive carbon black particles therein wherein viscosity properties have been optimized so that the product may be shipped or stored over long periods of time without significantly adversely affecting subsequent coating processes. At the same time, it is a more specific object to provide an improved viscosity conductive emulsion while maintaining or improving conductivity characteristics.

PRIOR ART

Conductive latex emulsions having carbon black or graphite therein as the conductive moiety have been known for years. In fact, the assignee of the invention, DAP, Inc., Dayton, Ohio, has produced one such conductive latex emulsion for several years wherein the entirety of the carbon black component was composed of acetylene black particles. As another example, U.S. Pat. No. 4,589,999 (Vasta) discloses an electrically conductive coating composition comprising a liquid carrier and a binder blend of (1) an acrylic polymer having glycidyl groups and (2) a crosslinkable polysiloxane. The conductive pigments disclosed in the '999 patent include furnace black, acetylene black and graphite. A mixture of carbon black and graphite is preferred.

In U.S. Pat. No. 4,705,646 (DuPont et al), a conductive coating comprising carbon black particles is sprayed onto a honeycomb-shaped structure which is at least partially composed of Kevlar ® aromatic polyamide polymer. U.S. Pat. No. 4,534,998 (DuPont et al) is of similar import.

A conductive coating composition comprising a graphite intercalation compound, carbon black, a binder and a solvent is disclosed in U.S. Pat. No. 4,957,723 (Nishino). Specifically disclosed carbon blacks are "KetJen Black Ec"-Akzo Chemie—and "Printex Ex 2"-Degussa—chosen by reason of their alleged superior structure and physical properties, such as pore volume and specific surface area.

A cathode coating dispersion for batteries containing graphite and/or carbon black is disclosed in U.S. Pat. No. 4,810,600 (Periard et al). The coating is applied as an aqueous dispersion comprising a binder which is a copolymer of (a) vinyl acetate and ethylene, (b) vinylacetate and vinyl chloride, (c) styrene and butadiene, or (d) vinyl acetate, vinyl chloride and ethylene.

Of further interest to the invention is U.S. Pat. No. 4,740,426 (Tremper III) which is directed toward a conductive primer composition in which the conductive carbon black pigments are preferably "Vulcan XC-72" furnace black pigments. These same carbon black pigments are preferred for use as a component of the carbon black blend constituent of the conductive latexes of the present invention.

DETAILED DESCRIPTION

Surprisingly, I have found that substitution of a specific blend of carbon black pigments for the carbon black component of a known conductive latex coating emulsion results in enhanced viscosity stability and hence workability of the coating emulsion. At the same time, the conductivity of the emulsion remains acceptable and is perhaps improved over the prior art latex coating emulsions.

More specifically, the conductive latex coating emulsion involves a known "standard" base. This base comprises:

|  | Weight Range of Component Based on Weight of Composition |
|---|---|
| (1) acrylic latex emulsion | 20-40% |
| (2) carbon black | 5-15% |
| (3) non-ionic surfactant | .5-2% |
| (4) zinc oxide | 0-2% |
| (5) pigment dispersant | 0-2% |
| (6) colloidal, proteinaceous aggregate | 0-1% |
| (7) ammonia | 0-1% |
| (8) water soluble acrylic resin thickener | 0-.5% |
| (9) defoaming agent | 0-.5% |
| (10) $K_2CO_3$ | 0-.10% |
| (11) xanthan gum thickener | 0-.10% |
| (12) fungicide | 0-.10% |
| (13) water | 50-90% |

The foregoing percentages add up to 100 wt. %.

Prior to this invention, the entire carbon black component of the "standard" base formulation consisted of an acetylene black (i.e., made from the thermal decomposition of acetylene gas), sold under the trademark "Shawinighan Black" available from Chevron. Reputedly, this particular carbon black is characterized as exhibiting a specific gravity of 1.95 $g/cm^3$ and a bulk density of 5-15 $lb/ft.^3$.

Quite surprisingly, I have found that substitution of a blend of the aforementioned acetylene black and a furnace black for the traditional carbon black component in the "standard" formulation, significantly increases the handleability of the conductive emulsion in that it stabilizes product viscosity; facilitating product shipment and storage. More importantly, this property improves thixotropic properties and allows the conductive emulsion to free-stand in process dip vats and the like where, ultimately, the wire or other materials will be immersed therein as part of the coating process.

Specifically, blends of about 10-50%:90-50% of acetylene black:furnace black (by weight—based upon total carbon black component in the emulsion formulation) may be used. At present, based upon experimental data, the preferred blend is 33.33% acetylene black and 66.66% furnace black.

The preferred furnace black is sold by Cabot under the trademark Vulcan XC72R. The product literature available for this material reports that it has a nitrogen surface area of 254 ($m^2/g$), a dibutyl phthalate absorption (cc/100 g) of 178, and a volatile content of 1.5%. Other reported characteristics are:
Jetness index: 87
particle size: 30 nm.
tinting strength index: 87
density: 6 lbs./ft.$^3$ The furnace blacks may be made in accordance with conventional techniques, such as those reported in U.S. Pat. Nos. 3,922,335; 3,952,087; or 4,105,750—incorporated herein by reference.

As to the latex emulsions that may be used as part of the formulation, these can be described generally as latexes comprising acrylic ester copolymers. Such copolymers are generally described in U.S. Pat. No. 4,007,147 (Leeson et al)—herein incorporated by reference. Generally, and in accord with the '147 disclosure, the major ingredient of the latex is a reactive acrylic ester polymer comprising an interpolymer of about 9–99% by weight of (a) an acrylic acid ester monomer, (b) up to about 90% of another comonomer or comonomers, and (c) from about 1–10% by weight of a reactive cure-site monomer(s).

The acrylic ester monomer is generally described as having the formula

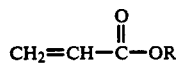

whereas R comprises $C_1$–$C_{18}$ alkyl, $C_2$–$C_8$ alkoxyalkyl or alkylthioalkyl or a cyanoalkyl group containing 2–8 carbon atoms. Examples of such monomers include methyl acrylate, ethyl acrylate, n-butyl acrylate, isobutyl acrylate, hexyl acrylate, octyl acrylate, 2-ethylhexyl acrylate, decyl acrylate, dodecyl acrylate, octadecyl acrylate, and the like; methoxyethyl acrylate, ethoxyethyl acrylate, and the like; and methylthioethyl acrylate, and the like; and $\alpha$, $\beta$, and $\gamma$-cyanopropyl acrylate, and the like.

The comonomer (b) of the reactive acrylic ester polymer can be one or more vinylidene comonomers containing a terminal $CH_2=C=$ group. Examples of such comonomers are the meth- and ethacrylic esters such as methyl methacrylate, ethyl methacrylate, n-butyl methacrylate, methyl ethacrylate, and the like; vinyl halides such as vinyl chloride, vinyl and allyl esters, such as vinyl acetate, vinyl butyrate, vinyl chloroacetate, and the like; and allyl acetate, methallyl propionate, and the like; vinyl aromatics, such as styrene, vinyl toluene, chloromethyl styrene, vinyl naphthalene, and the like; vinyl nitriles, such as acrylonitrile, methacrylonitrile, and the like.

As per the '147 patent disclosure, the reactive cure-site monomer is a carboxyl-containing vinylidene monomer or a hydroxyl-containing vinylidene monomer used alone or in combination with an acrylamide or carboxyl monomer. The hydroxyl-containing vinylidene monomer includes hydroxy-terminal acrylate monomers, such as $\beta$-hydroxyethyl acrylate and methacrylate, $\alpha$-hydroxypropyl acrylate, 4-hydroxybutyl acrylate, and the like; N-alkylol vinylidene amides, and hydroxymethyl derivatives of diacetone acrylamide of the formula

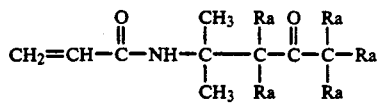

wherein $R\alpha$ is hydrogen or —$CH_2OH$ and the number of hydroxymethyl groups is at least one. Preferred are the N-alkylol amides of alpha, beta-olefinically unsaturated monocarboxylic acids containing 4 to 10 carbon atoms. Examples of such as N-methylol acrylamide, N-methylol methacrylamide, N-methylol maleamide, N-propanol acrylamide, N-methylol-p-vinyl benzamide, and the like. Most preferred because of their availability and cost are the N-alkylol amides of alpha, beta-monoolefinically unsaturated monocarboxylic acids, such as N-methylol acrylamide, N-methylol methacrylamide, and the like.

The carboxyl-containing vinylidene monomer is an $\alpha$, $\beta$-olefinically unsaturated carboxylic acid, such as acrylic and methacrylic acid, itaconic acid, citraconic acid, maleic acid, allyl acetic acid, and the like. More preferredly, the carboxyl monomer is vinylidene monocarboxylic acid containing 3 to about 6 carbon atoms, such as acrylic and methacrylic acid. The hydroxyl-containing vinylidene monomers are preferredly used in combination with an acrylamide monomer or a carboxyl monomer. The acrylamide monomer is acrylamide or methacrylamide.

The preferred acrylic ester copolymers are purchased from BF Goodrich under the Hy-Car 26120 designation. This product is described simply in the product literature as an anionic acrylic ester copolymer.

The choice of a non-ionic surfactant is not critical. For example, these may include ethylene oxide condensates of straight chain alcohols, fatty acid amides ethylene oxide condensates of alkylphenols, etc. Presently, the alkylphenoxy ethylene oxide condensates having the formula

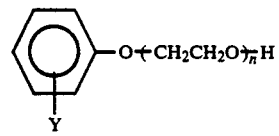

are preferred wherein n=6–100 and y is $C_8$–$C_{16}$ alkyl. Such alkylphenoxy ethylene oxide non-ionic surfactants are sold by Rohm & Haas under the Triton trademark. The most preferred is Triton X-100 which is an isooctyl phenoxy polyethoxy ethanol containing 10 moles of ethoxylation.

Sundry pigments, pigment dispersants and aggregates may be added to the formulation in the amounts indicated supra. Additionally known latex thickening agents, such as those available under the "Acrysol" label from Rohm & Haas may be employed in the requisite amount. Defoaming agents and fungicides may also be advantageously incorporated into the emulsion. Other thickeners, such as xanthan gum, carboxymethylcellulose, etc., can also be used to regulate emulsion viscosity.

Surprisingly, use of the blend of carbon blacks provides a stable emulsion that can be easily employed in standard dip coating processes which are used to coat the desired wire or strand. In accordance with such conventional processes, vats containing the conductive latex emulsion are provided wherein the wires or strand may be either continuously or batch-wise immersed therein. A plurality of immersions may be used followed by ambient drying in order to impart a durable coating to the wire or strand. However, heat drying at elevated temperatures of, for example, 400°–500° F. is preferred.

At present, the conductive emulsion of the invention is used to coat "Kevlar" wires (polyaromatic amide) for ultimate end-use as automotive spark plug wires. Needless to say, the conductive emulsion of the invention can be used to coat a plurality of other wire or strand substrates, including copper, aluminum, or other metal or glass, or plastic substrates.

EXAMPLES

In order to assess the efficacy of the latex coating emulsions in accordance with the invention in stabilizing viscosity and reducing resistivity of wire coated therewith, the following tests were undertaken.

EXAMPLE ONE

Viscosity Stabilization Studies

Candidate emulsions were prepared and allowed to stand over various periods of time as indicated in the following Table. pH and viscosity measurements of the candidate emulsions were made. In various test cases, buffer salts were added in an attempt to stabilize pH drift. Results are shown in Table I.

TABLE I

| Candidate Emulsion | Buffer Addition | pH/viscosity | | | | |
|---|---|---|---|---|---|---|
| | | 1 Hour | 48 Hours | 2 Weeks | 3 Weeks | 4 Weeks |
| A | None | 10.65/600 | 9.54/900 | 9.41/950 | 9.39/1100 | 9.38/1250 |
| B | None | 9.75/950 | 9.59/1100 | 9.43/1200 | 9.38/1200 | 9.3/1300 |
| B | $Na_2HPO_4$ | 9.75/1450 | 9.74/1900 | 10.17/1950 | 10.41/2350 | 10.41/2300 |
| B | $Na_2CO_3$ | 10.38/1650 | 10.19/2700 | 10.02/3700 | 10.03/3600 | 10.18/3500 |
| B | $Na_2B_4O_7$ | 9.45/900 | 9.45/1200 | 9.34/1400 | 9.32/1500 | 9.33/1600 |
| C | None | 9.30/2350 | 9.22/2700 | 9.21/2700 | 9.24/2900 | 9.18/3000 |
| C | $Na_3PO_4$ | 9.60/2450 | 9.82/2700 | 9.80/3050 | 9.99/3300 | 10.09/3450 |
| C | $Na_2HPO_4$ | 9.36/2300 | 9.44/2550 | 9.59/2800 | 10.04/3250 | 10.18/3250 |
| C | $Na_2CO_3$ | 9.97/2300 | 9.95/2400 | 9.95/2700 | 9.93/2900 | 9.86/3000 |

Notes: Table I

Viscosity measurements: Brookfield RVT Spindle #4@20 rpm.

A = emulsion in accordance with the invention comprising the standard formulation but having a blend of carbon blacks. The blend is 66% Vulcan XC72R 33% Shawinigan Black.

B = standard formulation wherein carbon black component = 100% Shawinigan Black

C = standard-carbon black component = 100% Shawinigan Black

Note "C" was not freshly made but had been made sometime prior to the experiment.

standard =
- 60.200% water
- 28.250% Hycar 26120 anionic acrylic latex emulsion
- 8.050% carbon black
- 0.730% non-ionic surfactant Triton X-100
- 0.720% ZnO
- 0.613% Pigment Dispersing Agent—Darvan No. 1
- 0.466% colloidal, proteinaceous aggregate—Casein MM3
- 0.466% ammonia
- 0.170% water soluble acrylic resin thickener
- 0.159% defoaming agent
- 0.068% $K_2CO_3$ (45%)
- 0.057% xanthan gum thickening agent—Kelzan
- 0.057% fungicide—Skane M-8

When buffer salts were used, the overall candidate emulsion comprised 99.4% emulsion 0.6% buffer salt.

EXAMPLE TWO

Kevlar® wires (polyaromatic amide) were immersed in candidate emulsions. Drying and wire immersion parameters were varied as indicated. Resistance of each of the dipped wires was measured. Results are shown in Table II.

| Candidate Emulsion | Process Parameters | Resistance ohms/foot |
|---|---|---|
| A | wire immersed once, air dried | 3000 |
| B | wire immersed once, air dried | 4000/3600 |
| A | wire immersed 7 times, heat drying | 1300 |
| B | wire immersed 7 times, heat drying | 1800–2000 |

Note
emulsions A and B are the same as given in Table I, supra.

Discussion Tables I and II

Table I indicates that the emulsions, differing only in the type of carbon black employed in the formulation, resulted in a wide variety of viscosities and pH drift ranges. However, the formulation containing the acetylene black/furnace black blend of carbon blacks provided low viscosity and exhibited suitable pH drift range. Similarly, with respect to Table II, the coating emulsions having the specific acetylene black/furnace black blend of carbon blacks exhibited superior resistivity values.

Accordingly, it is apparent that the conductive latex dispersion in accordance with the invention comprises a blend of acetylene carbon black particles and furnace black particles. The acetylene black particles preferably comprise a bulk density of 5–15 lbs./cu.ft.$^3$. The content of acetylene black particles, with respect to the entire carbon black component can comprise from about 10–50% (by weight). However, it is preferred to use about one-third acetylene black particles, remainder furnace black particles.

The furnace black particles are characterized by having a nitrogen surface area (m$^2$/gm) of about 250 or greater and a DBP absorption value cc/100 gm of about 180 or above.

The emulsion, in accordance with the invention, should be sufficient to result in a viscosity of about 900-1000 cps after the emulsion has been stored from about 48 hours to about 2 weeks.

While I have shown and described herein certain embodiments of the present invention, it is intended that there be covered as well any change or modification therein which may be made without departing from the spirit and scope of the invention as defined in the appended claims.

I claim:

1. Method of coating wire with a conductive coating comprising providing a stable conductive latex dispersion comprising a blend of about 10-50% acetylene carbon black particles and about 90-50% furnace carbon black particles therein based upon the weight of said carbon black particles present in said dispersion to impart a viscosity to said dispersion of between about 900—about 1250 cps upon storage thereof for about 48 hours—to about 4 weeks, immersing said wire in said dispersion, and drying said wire.

2. Method as recited in claim 1 wherein said acetylene carbon black particles have a bulk density of 5-15 lbs./ft.$^3$ and said furnace carbon black particles have a nitrogen surface area (m$^2$/gm) of about 250 or greater.

3. Method as recited in claim 2 wherein said furnace black particles have a DBP absorption value cc/100 gm of about 180 or above.

4. Method as recited in claim 3 wherein said blend comprises about ⅓ by weight said acetylene black particles and remainder said furnace black particles.

5. Method as recited in claim 4 wherein said latex comprises an acrylic ester copolymer.

6. Method as recited in claim 5 wherein said drying comprises subjecting said wire to ambient conditions.

7. Method as recited in claim 5 wherein said drying comprises subjecting said wire to elevated temperatures of about 400°-500° F.

* * * * *

UNITED STATES PATENT AND TRADEMARK OFFICE
CERTIFICATE OF CORRECTION

PATENT NO. : 5,234,627

DATED : August 10, 1993

INVENTOR(S) : Brian L. Damschroder

It is certified that error appears in the above-identified patent and that said Letters Patent is hereby corrected as shown below:

Col. 7, line 16:

Claim 1, line 3, after "stable", add --aqueous--.

Signed and Sealed this

Twenty-ninth Day of March, 1994

Attest:

BRUCE LEHMAN

*Attesting Officer*   *Commissioner of Patents and Trademarks*